United States Patent
Yang et al.

(10) Patent No.: US 11,594,130 B1
(45) Date of Patent: Feb. 28, 2023

(54) WARNING SYSTEM AND METHOD FOR TWO-WHEELED VEHICLE

(71) Applicant: INSTITUTE FOR INFORMATION INDUSTRY, Taipei (TW)

(72) Inventors: Yao-Shun Yang, Taipei (TW); Hui-Tzu Huang, Taipei (TW); Jian-Ying Chen, Taipei (TW); Chuan-Chuan Wang, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 0 days.

(21) Appl. No.: 17/453,172

(22) Filed: Nov. 1, 2021

(51) Int. Cl.
*G08G 1/0967* (2006.01)
*G08G 1/056* (2006.01)
*G08G 1/052* (2006.01)
*G08G 1/0968* (2006.01)
*G08G 1/16* (2006.01)
*G06K 9/62* (2022.01)

(52) U.S. Cl.
CPC ......... *G08G 1/0967* (2013.01); *G06K 9/6218* (2013.01); *G08G 1/052* (2013.01); *G08G 1/056* (2013.01); *G08G 1/096888* (2013.01); *G08G 1/164* (2013.01); *G08G 1/166* (2013.01)

(58) Field of Classification Search
None
See application file for complete search history.

(56) References Cited

U.S. PATENT DOCUMENTS

| 2011/0063120 | A1* | 3/2011 | Ebner | B62K 21/26 340/665 |
| 2016/0352845 | A1* | 12/2016 | Nieh | H04B 1/385 |
| 2019/0212735 | A1* | 7/2019 | Fujiwara | G05D 1/0212 |
| 2021/0166558 | A1* | 6/2021 | Giraud | G08G 1/0133 |

FOREIGN PATENT DOCUMENTS

CN 111829548 A 10/2020

* cited by examiner

*Primary Examiner* — John F Mortell
(74) *Attorney, Agent, or Firm* — CKC & Partners Co., LLC (57) ABSTRACT

A warning system and method are provided. The warning system includes a plurality of sensing apparatuses and a server. The sensing apparatuses are used for sensing a driving trajectory of each of a plurality of two-wheeled vehicles. The server compares the driving trajectories with an accident hotspot list to determine whether at least one first driving trajectory matches an accident hotspot location, wherein the accident hotspot list is generated by a plurality of driving behavior events corresponding to each of the two-wheeled vehicles. The server generates a warning message to remind a first driver of a first two-wheeled vehicle corresponding to the at least one first driving trajectory when determining that the at least one first driving trajectory matches the accident hotspot location.

16 Claims, 4 Drawing Sheets

WARNING SYSTEM AND METHOD FOR TWO-WHEELED VEHICLE

BACKGROUND

Field of Invention

The present invention relates to a warning system and method. More particularly, the present invention relates to a warning system and method based on a driving trajectory.

Description of Related Art

Two-wheeled vehicles are an important means of transportation and the two-wheeled vehicles are widely used in road transportation. However, the dangerous driving behavior of the two-wheeled vehicles will not only endanger the safety of the driver and the other people on the road but also indirectly affect the use efficiency of the road and increase the burden on the traffic police.

Accordingly, there is an urgent need for a technology that can provide a mechanism to use big data to analyze the dangerous driving behavior of the two-wheeled vehicle and automatically generate a warning message to remind the driver to reduce the dangerous driving behavior.

SUMMARY

An objective of the present invention is to provide a warning system. The warning system comprises a plurality of sensing apparatuses and a server. The server is connected to the sensing apparatuses through a network. The sensing apparatuses sense a driving trajectory of each of a plurality of two-wheeled vehicles. The server compares the driving trajectories with an accident hotspot list to determine whether at least one first driving trajectory matches an accident hotspot location, wherein the accident hotspot list is generated by a plurality of driving behavior events corresponding to each of the two-wheeled vehicles. The server generates a warning message to remind a first driver of a first two-wheeled vehicle corresponding to the at least one first driving trajectory when determining that the at least one first driving trajectory matches the accident hotspot location.

Another objective of the present invention is to provide a warning method, which is adapted for use in a warning system. The warning system comprises a plurality of sensing apparatuses and a server. The sensing apparatuses sense a driving trajectory of each of a plurality of two-wheeled vehicles. The warning method is performed by the server and comprises following steps: receiving the driving trajectories from the sensing apparatuses; comparing the driving trajectories with a plurality of driving behavior events to determine whether at least one first driving trajectory matches an accident hotspot location; and generating a warning message to remind a first driver of a first two-wheeled vehicle corresponding to the at least one first driving trajectory when determining that the at least one first driving trajectory matches the accident hotspot location.

According to the above descriptions, the warning technology (including the system and the method) provided by the present invention receives the sensing data of a plurality of two-wheeled vehicles, analyzes the driving behavior events corresponding to each of the two-wheeled vehicles, determines the cluster location of the dangerous driving behavior events, and generates an accident hotspot list. In addition, the present invention compares the accident hotspot list with the driving trajectories of the two-wheeled vehicles. When a driver's driving trajectory matches an accident hotspot location in the accident hotspot list, the present invention sends a warning message to remind the driver. Furthermore, the present invention further provides a warning by the driving evaluation score, and sends a warning message to remind drivers that do not meet the driving evaluation score. The warning technology provided by the present invention automatically generates warning messages to remind the driver of the two-wheeled vehicle based on analyzing driving behavior events, so as to avoid accidents caused by dangerous driving behaviors.

The detailed technology and preferred embodiments implemented for the subject invention are described in the following paragraphs accompanying the appended drawings for people skilled in this field to well appreciate the features of the claimed invention.

DETAILED DESCRIPTION

In the following description, a warning system and method according to the present invention will be explained with reference to embodiments thereof. However, these embodiments are not intended to limit the present invention to any environment, applications, or implementations described in these embodiments. Therefore, description of these embodiments is only for purpose of illustration rather than to limit the present invention. It shall be appreciated that, in the following embodiments and the attached drawings, elements unrelated to the present invention are omitted from depiction. In addition, dimensions of individual elements and dimensional relationships among individual elements in the attached drawings are provided only for illustration but not to limit the scope of the present invention.

Figure 1:
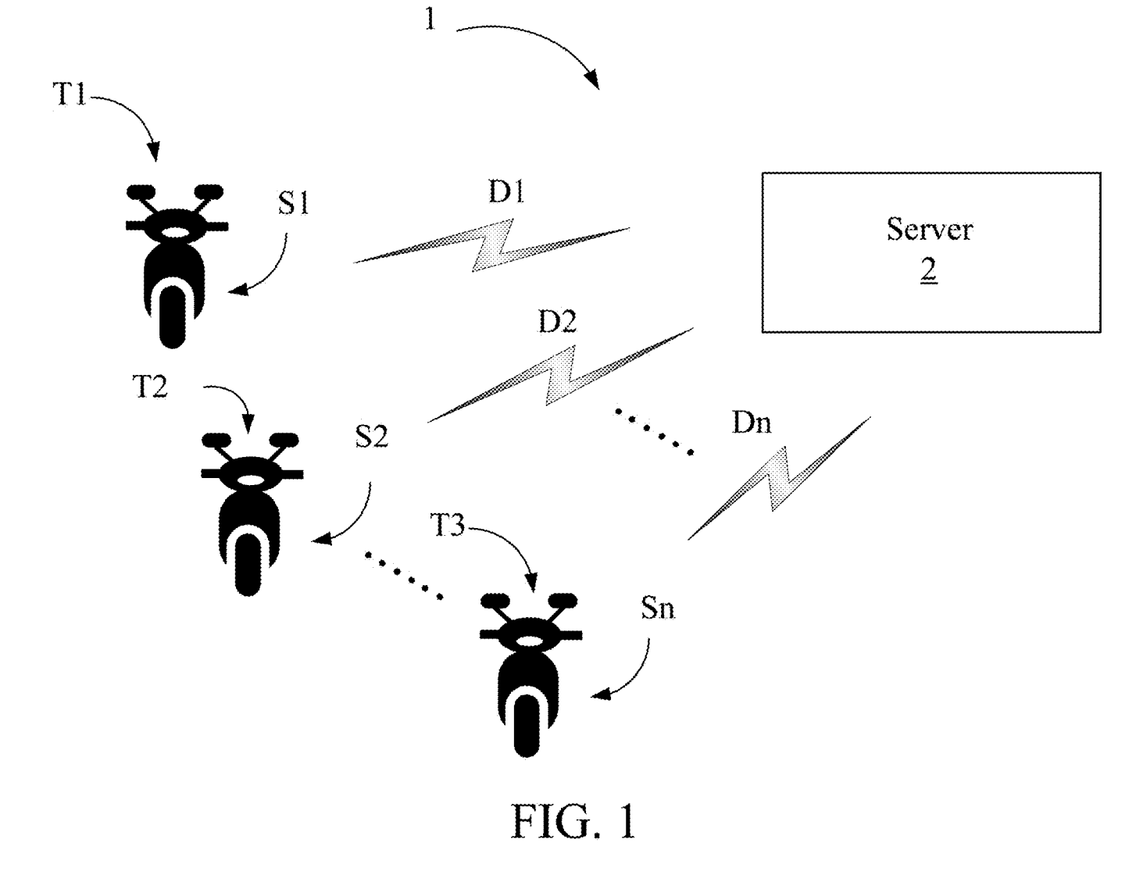
FIG. 1 is a schematic view depicting an applicable scenario of a warning system of the first embodiment.

First, an applicable scenario of the present embodiment will be explained, and a schematic view is depicted in FIG. 1. As shown in FIG. 1, in the first embodiment of the present invention, the warning system 1 includes the server 2 and a plurality of sensing apparatuses S1, S2, Sn installed on a plurality of two-wheeled vehicles T1, T2, . . ., Tn. In this scenario, the sensing apparatuses S1, S2, Sn are connected to the server 2 through a wireless network. It shall be appreciated that the sensing apparatuses S1, S2, Sn continuously generate the sensing data D1, D2, Dn (e.g., at a frequency of 10 times per second), the sense data D1, D2, Dn are sent to the server 2 to perform subsequent analysis operations.

For example, the sensing apparatuses S1, S2, Sn may comprise at least one or a combination of components such as a global positioning system, an inertial sensor, an acceleration sensor, a timer, and the like. The sensing apparatuses S1, S2, . . ., Sn can be installed on the on board unit (OBU) equipment on the two-wheeled vehicles T1, T2, . . ., Tn to collect the sensing data of the two-wheeled vehicles T1, T2, . . ., Tn. Each of the sensing data can include the driving data, for example, global positioning system (GPS), speed, direction angle, driving time, two-wheeled vehicle identity, etc., and the server 2 will use some or all of the driving data in each analysis operation.

It shall be appreciated that, for ease of understanding, the following descriptions are based on each of the two-wheeled vehicles T1, T2, Tn corresponding to a fixed driver as an example. In some embodiments, the server 2 can also log in through an account (e.g., verify the current driver of a two-wheeled vehicle), and perform operations for an embodiment with more than one driver corresponding to a two-wheeled vehicle. Those of ordinary skill in the art shall easily appreciate the embodiment of the multiple drivers based on the aforementioned descriptions. Therefore, the details will not be repeated herein.

In the present invention, there are mainly two ways of warning, namely, an accident hotspot location warning and a driving evaluation score warning. The following paragraphs will describe the implementation details related to the present invention in detail.

First, the operations of the first embodiment of the present invention will be briefly explained. The server 2 in the present invention can receive the sensing data D1, D2, Dn corresponding to the two-wheeled vehicles T1, T2, Tn, analyze driving behavior events corresponding to each of the two-wheeled vehicles T1, T2, Tn, determine locations of the dangerous driving behavior event clusters, and generate an accident hotspot list. In addition, the server 2 compares the accident hotspot list with the driving trajectories of the two-wheeled vehicles T1, T2, . . ., Tn. When a driver's driving trajectory matches a accident hotspot location in the accident hotspot list, the server 2 will send a warning message to remind the driver. The following paragraphs will describe the operations of the first embodiment in detail.

Figure 2:
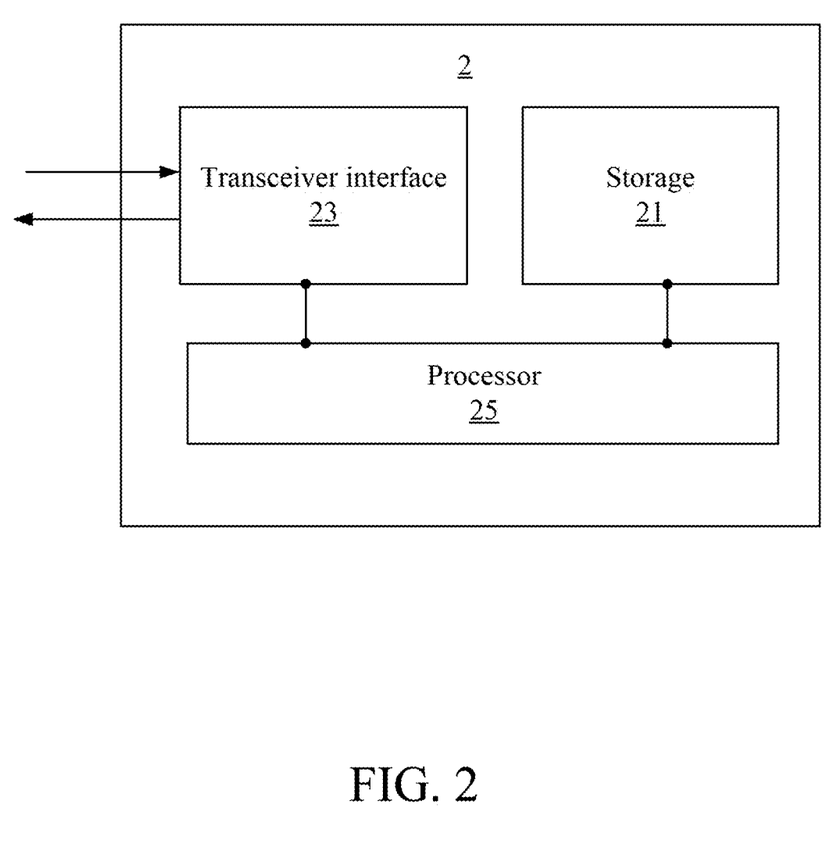
FIG. 2 is a schematic view depicting a server of the first embodiment.

A schematic view of the server 2 of the first embodiment in the present invention is depicted in FIG. 2. The server 2 comprises a storage 21, a transceiver interface 23 and a processor 25, wherein the processor 25 is electrically connected to the storage 21 and the transceiver interface 23. The storage 21 may be a memory, a Universal Serial Bus (USB) disk, a hard disk, a Compact Disk (CD), a mobile disk, or any other storage medium or circuit known to those of ordinary skill in the art and having the same functionality. The transceiver interface 23 is an interface capable of receiving and transmitting data or other interfaces capable of receiving and transmitting data and known to those of ordinary skill in the art. The transceiver interface 23 can receive data from sources such as external apparatuses, external web pages, external applications, and so on. The processor 25 may be any of various processors, Central Processing Units (CPUs), microprocessors, digital signal processors or other computing apparatuses known to those of ordinary skill in the art.

Next, please refer to FIG. 1 and FIG. 2 at the same time. In the present embodiment, the sensing apparatuses S1, S2, Sn are installed on the two-wheeled vehicles T1, T2, Tn and generate the sensing data D1, D2, . . ., Dn. The sensing data D1, D2, . . ., Dn can indicate the driving trajectory of each of the two-wheeled vehicles. For example, the driving trajectory of each of the two-wheeled vehicles can be calculated by the global positioning system (GPS) in the sensing data D1, D2, . . ., Dn.

In the present embodiment, the server 2 compares the driving trajectories with an accident hotspot list to determine whether at least one first driving trajectory matches an accident hotspot location, wherein the accident hotspot list is generated by a plurality of driving behavior events corresponding to each of the two-wheeled vehicles. Next, the server 2 generates a warning message to remind a first driver of a first two-wheeled vehicle corresponding to the at least one first driving trajectory when determining that the at least one first driving trajectory matches the accident hotspot location.

It shall be appreciated that there may be misjudgments in the driving trajectory due to the positioning based on the Global Positioning System (GPS), which may be caused by the lack of accuracy of the GPS (e.g., a two-wheeled vehicle is actually driving on road A, but is being positioned to be driving on road B adjacent to road A). Therefore, in some embodiments, in order to more accurately determine the driving trajectory of each of the two-wheeled vehicles, the server 2 further calculates the possible routes through the map data in advance, and based on the corresponding forward direction of the two-wheeled vehicle, excludes some unreasonable routes to correct the driving trajectory. Furthermore, the corrected driving trajectory can also provide a more accurate calculation of the speed of two-wheeled vehicles for the subsequent operations.

Specifically, the server 2 obtains at least one candidate route corresponding to each of the two-wheeled vehicles based on a map data. Then, the server 2 selects a shortest route from the at least one candidate route to correct the driving trajectory of each of the two-wheeled vehicles based on the driving trajectory and a corresponding forward direction of each of the two-wheeled vehicles.

For example, the server 2 first obtains routes within 100 meters around the two-wheeled vehicle as candidate routes based on the map data. Then, the server 2 removes the route that has an excessively large angle with the forward direction of the two-wheeled vehicle from the candidate routes (e.g., routes with an angle of more than 90 degrees with the forward direction of the two-wheeled vehicle), use the shortest path algorithm (e.g., A*, Dijkstra, Best-First, Bi-directional A*, Breadth First Search (BFS), Iterative Deepening A* and other algorithms) to calculate the shortest paths, filter the shortest path according to the connectivity of the front and rear paths and the reasonable speed, and use the filtered shortest path as the corrected driving trajectory of the two-wheeled vehicle.

The following will explain the generation method of the accident hotspot list and the accident hotspot location. First, the server 2 needs to collect the driving behavior events of each of the two-wheeled vehicles T1, T2, . . ., Tn.

In some embodiments, the server 2 receives from the sensing apparatuses S1, S2, Sn a driving data of each of the two-wheeled vehicles T1, T2, Tn, which including a speed value and a direction change amount corresponding to each of the two-wheeled vehicles during a running time. Next, the server 2 analyzes the driving data to generate the driving behavior events corresponding to each of the two-wheeled vehicles. For example, the server 2 can count the driving data of the two-wheeled vehicles T1, T2, . . ., Tn based on different time intervals (e.g., a fixed time length as one time, and a complete trip as one time), and generate the driving behavior events corresponding to each of the two-wheeled vehicles T1, T2, . . ., Tn.

Next, the server 2 further determines dangerous driving behavior events among the driving behavior events, and generates the accident hotspot list based on the amount and the location of the dangerous driving behavior events. Specifically, the server 2 calculates at least one outlier among the driving behavior events to generate a plurality of dangerous driving behavior events corresponding to the two-wheeled vehicles. Next, the server 2 performs a clustering algorithm on a piece of location information corresponding to each of the dangerous driving behavior events to generate a plurality of dangerous driving behavior event clusters.

Finally, the server 2 generates the accident hotspot list based on an amount of events and a central location of each cluster corresponding to each of the dangerous driving behavior event clusters.

For example, if the event "rapid acceleration and deceleration" (i.e., the speed value fluctuates too much within a period of time) is defined as a dangerous driving behavior event, the server 2 can calculate the amount of "rapid acceleration and deceleration" events among the driving behavior events of each of the two-wheeled vehicles T1, T2, Tn (e.g., the amount of "rapid acceleration and deceleration" event per kilometer), combined with the historical data in the historical database (i.e., the driving behavior events data collected in the past) to count the normal distribution state of the driving behavior events, and classify the driving behavior events falling in the abnormal distribution range (i.e., outliers) to the dangerous driving behavior events. In other words, the server 2 classifies the driving behavior events that are significantly different from normal data as the dangerous driving behavior events based on the statistical data.

It shall be appreciated that the server 2 can also define a variety of dangerous driving behavior events. For example: the server 2 can count statistics of driving behavior events based on the following items: "sharply turning" (i.e., the amount of the "sharply turning" event per kilometer), "overspeed" (i.e., the amount of the "overspeed" event per kilometer), "average speed" (i.e., the "average speed" event of the trip), "directional disorder" (i.e., for the yaw phenomenon of the two-wheeled vehicle during driving, the unit is the number of meters of deviation per second), "acceleration disturbance" (i.e., the standard deviation of the acceleration between the driving, the unit is per kilometer hour). Those of ordinary skill in the art shall easily appreciate the embodiment of the variety of dangerous driving behavior events with different definitions based on the aforementioned descriptions. Therefore, the details will not be repeated herein.

In addition, the server 2 further executes a K-means algorithm to cluster the locations where the dangerous driving behavior events occur, and generates a plurality of dangerous driving behavior event clusters. Then, the server 2 sets the top 5 of the amount of dangerous driving behavior event clusters as the accident hotspot list, and uses the center position of the top 5 dangerous driving behavior event clusters as the accident hot spot locations. Finally, when the server 2 determines that there is a two-wheeled vehicle (e.g., one of the two-wheeled vehicles T1, T2, . . ., Tn) is around the accident hotspot location in the accident hotspot list (e.g., within 200 meters from the accident hotspot location), the server 2 generates a warning message to notify the driver that needs to pay attention to his/her driving.

Figure 3:
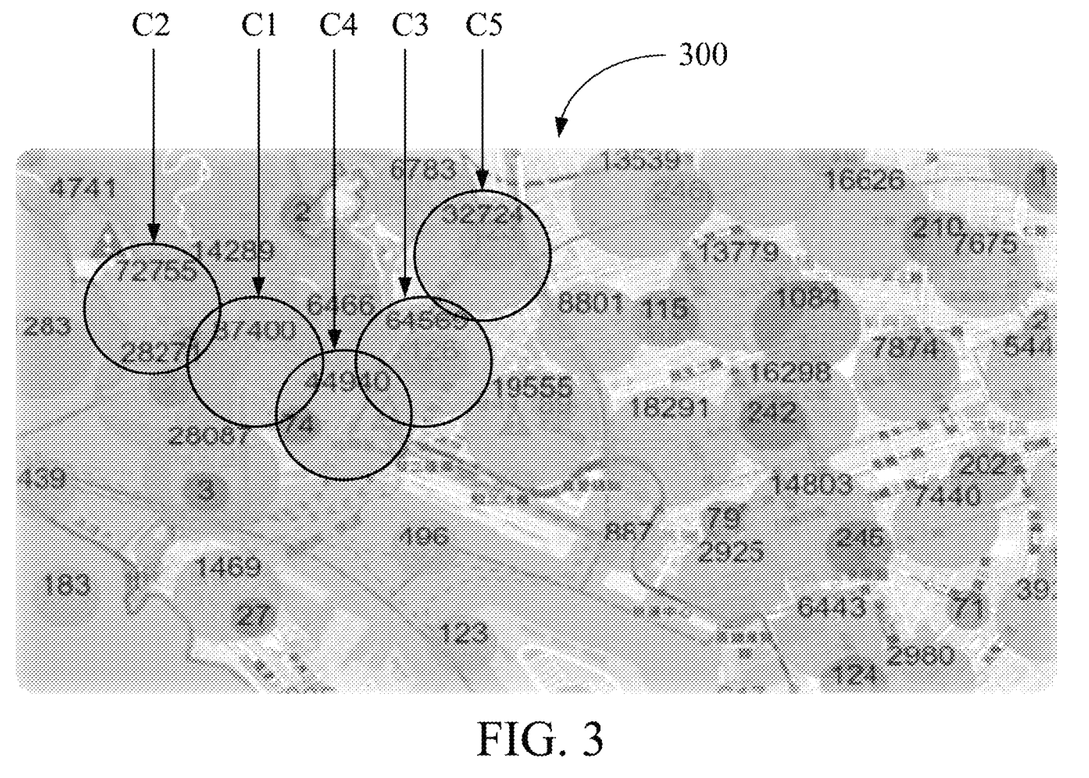
FIG. 3 is a schematic view depicting an area map and a plurality of dangerous driving behavior event clusters of the first embodiment.

Taking an actual case as an example, FIG. 3 depicts a plurality of dangerous driving behavior event clusters in the area map 300. In FIG. 3, each circle and number respectively represent the dangerous driving behavior event cluster and the corresponding amount of events. If the accident hotspot list is the top 5 dangerous driving behavior event clusters, the dangerous driving behavior event clusters C1, C2, C3, C4, and C5 in the area map 300 are the top 5 clusters. Therefore, the dangerous driving behavior event clusters C1, C2, C3, C4, and C5 and their center position of clusters are the accident hotspot list and the accident hotspot locations.

In addition, the present invention further provides a driving evaluation score warning to send a warning message to remind drivers that do not meet the driving evaluation score. Specifically, the server 2 further calculates a driving evaluation score corresponding to each of the two-wheeled vehicles based on the driving behavior events. Then, the server 2 determines whether the driving evaluation score of a second two-wheeled vehicle is lower than a threshold. Finally, generates a second warning message to remind a second driver of the second two-wheeled vehicle when determining that the driving evaluation score of the second two-wheeled vehicle is lower than the threshold.

For example, the server 2 can use the various dangerous driving behavior events defined in the foregoing example to count the amount of events and distribution intervals of dangerous driving behaviors of each of the two-wheeled vehicles T1, T2, Tn (e.g., normal distribution state), use the Standard Deviation (SD) difference table in Table 1 below to calculate the safety rating for two-wheeled vehicles T1, T2, . . ., Tn.

TABLE 1

| Standard Deviation (SD) difference | safety rating |
| --- | --- |
| >2 SD | dangerous |
| 1.5 SD-2 SD | slightly dangerous |
| 1.2 SD-1.5 SD | normal |
| 1 SD-1.2 SD | slightly safer |
| 0-1 SD | safer |

In some embodiments, in order to immediately remind the driver, a safety helmet (e.g., a safety helmet with a wireless network connection function) can be used to make a buzzer sound or voice reminder to the driver. Specifically, the server 2 can directly send the warning message to a helmet worn by the first driver, and the helmet is configured to emit a warning sound to remind the first driver.

In some embodiments, in order to immediately remind the driver, the driver's mobile apparatus can be connected to the helmet (e.g., a helmet with Bluetooth, short-distance connection, etc.) to make the helmet buzz or voice reminder to drive. Specifically, the server 2 is configured to send the warning message to a mobile apparatus of the first driver, and the mobile apparatus further transmits the warning message to a helmet worn by the first driver, and the helmet is configured to emit a warning sound to remind the first driver.

In some embodiments, in order to immediately remind the driver, the dashboard of the two-wheeled vehicle (e.g., a smart dashboard that can display driving information) can be used to emit warning sounds or flashing lights to remind the driver. Specifically, the server 2 is configured to send the warning message to a mobile apparatus of the first driver, the mobile apparatus further transmits the warning message to a dashboard of the first two-wheeled vehicle, and the dashboard generates a warning sound or a flashing light to remind the first driver.

According to the above descriptions, the warning system 1 provided by the present invention receives the sensing data of a plurality of two-wheeled vehicles, analyzes the driving behavior events corresponding to each of the two-wheeled vehicles, determines the cluster location of the dangerous driving behavior events, and generates an accident hotspot list. In addition, the warning system 1 compares the accident hotspot list with the driving trajectories of the two-wheeled vehicles. When a driver's driving trajectory matches an accident hotspot location in the accident hotspot list, the warning system 1 sends a warning message to remind the driver. Furthermore, the warning system 1 further provides a warning by the driving evaluation score, and sends a warning message to remind drivers that do not meet the driving evaluation score. The warning technology provided by the present invention automatically generates warning messages to remind the driver of the two-wheeled vehicle based on analyzing driving behavior events, so as to avoid accidents caused by dangerous driving behaviors.

Figure 4:
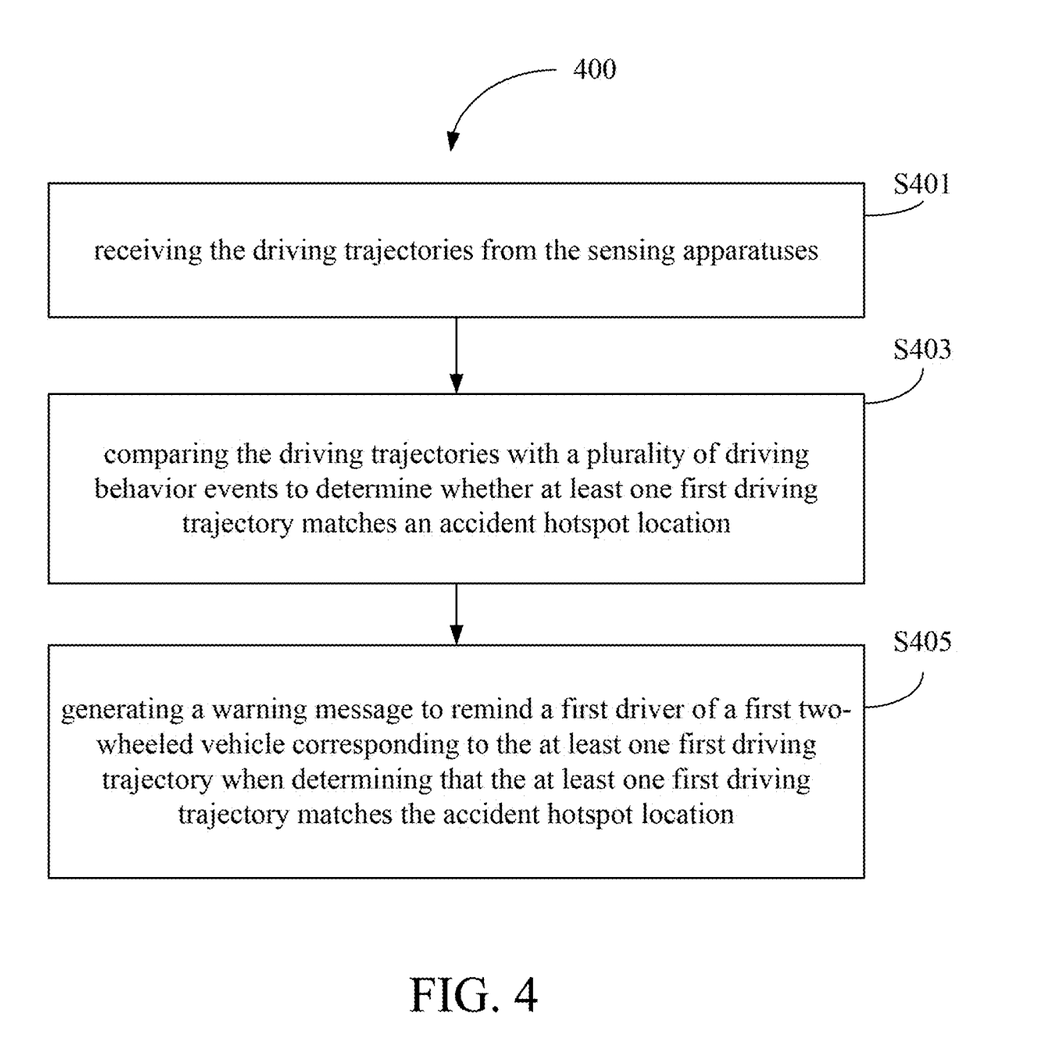
FIG. 4 is a partial flowchart depicting a warning method of the second embodiment.

A second embodiment of the present invention is a warning method and a flowchart thereof is depicted in FIG. 4. The warning method 400 is adapted for a warning system (e.g., the warning system 1 of the first embodiment). The warning system comprises a plurality of sensing apparatuses and a server (e.g., the sensing apparatuses S1, S2, Sn and the server 2 of the first embodiment). The sensing apparatuses sense a driving trajectory of each of a plurality of two-wheeled vehicles. The warning method 400 generates a warning message to remind the driver of a two-wheeler through the steps S401 to S405.

In the step S401, the server receives the driving trajectories from the sensing apparatuses. In the step S403, the server compares the driving trajectories with a plurality of driving behavior events to determine whether at least one first driving trajectory matches an accident hotspot location.

In the step S405, the server generates a warning message to remind a first driver of a first two-wheeled vehicle corresponding to the at least one first driving trajectory when determining that the at least one first driving trajectory matches the accident hotspot location.

In some embodiments, the warning method 400 further comprises following steps: obtaining at least one candidate route corresponding to each of the two-wheeled vehicles based on a map data; and selecting a shortest route from the at least one candidate route to correct the driving trajectory of each of the two-wheeled vehicles based on the driving trajectory and a corresponding forward direction of each of the two-wheeled vehicles.

In some embodiments, the warning method 400 further comprises following steps: receiving a driving data of each of the two-wheeled vehicles from the sensing apparatuses; and analyzing the driving data to generate the driving behavior events corresponding to each of the two-wheeled vehicles.

In some embodiments, wherein the driving data includes a speed value and a direction change amount corresponding to each of the two-wheeled vehicles during a running time.

In some embodiments, the warning method 400 further comprises following steps: calculating at least one outlier among the driving behavior events to generate a plurality of dangerous driving behavior events corresponding to the two-wheeled vehicles; performing a clustering algorithm on a piece of location information corresponding to each of the dangerous driving behavior events to generate a plurality of dangerous driving behavior event clusters; generating an accident hotspot list based on an amount of events and a central location of each cluster corresponding to each of the dangerous driving behavior event clusters; and comparing the driving trajectories with the accident hotspot list to determine whether the at least one first driving trajectory matches the accident hotspot location.

In some embodiments, the warning method 400 further comprises following steps: calculating a driving evaluation score corresponding to each of the two-wheeled vehicles based on the driving behavior events; determining whether the driving evaluation score of a second two-wheeled vehicle is lower than a threshold; and generating a second warning message to remind a second driver of the second two-wheeled vehicle when determining that the driving evaluation score of the second two-wheeled vehicle is lower than the threshold.

In some embodiments, the server is configured to send the warning message to a helmet worn by the first driver, and the helmet is configured to emit a warning sound to remind the first driver.

In some embodiments, the server is configured to send the warning message to a mobile apparatus of the first driver, and the mobile apparatus further transmits the warning message to a helmet worn by the first driver, and the helmet is configured to emit a warning sound to remind the first driver.

In some embodiments, the server is configured to send the warning message to a mobile apparatus of the first driver, the mobile apparatus further transmits the warning message to a dashboard of the first two-wheeled vehicle, and the dashboard generates a warning sound or a flashing light to remind the first driver.

In addition to the aforesaid steps, the second embodiment can also execute all the operations and steps of the warning system 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

It shall be appreciated that in the specification and the claims of the present invention, some words (e.g., driving trajectory, two-wheeled vehicle, and driver) are preceded by terms such as "first" or "second," and these terms of "first" and "second" are only used to distinguish these different words. For example, the "first" and "second" in the first driver and the second driver are only used to indicate the target driver used in different operations.

According to the above descriptions, the warning technology (including the system and the method) provided by the present invention receives the sensing data of a plurality of two-wheeled vehicles, analyzes the driving behavior events corresponding to each of the two-wheeled vehicles, determines the cluster location of the dangerous driving behavior events, and generates an accident hotspot list. In addition, the present invention compares the accident hotspot list with the driving trajectories of the two-wheeled vehicles. When a driver's driving trajectory matches an accident hotspot location in the accident hotspot list, the present invention sends a warning message to remind the driver. Furthermore, the present invention further provides a warning by the driving evaluation score, and sends a warning message to remind drivers that do not meet the driving evaluation score. The warning technology provided by the present invention automatically generates warning messages to remind the driver of the two-wheeled vehicle based on analyzing driving behavior events, so as to avoid accidents caused by dangerous driving behaviors.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A warning system, comprising:
a plurality of sensing apparatuses, being configured to sense a driving trajectory of each of a plurality of two-wheeled vehicles; and
a server, being connected to the sensing apparatuses through a network, and being configured to perform operations comprising:
  comparing the driving trajectories with an accident hotspot list to determine whether at least one first driving trajectory matches an accident hotspot location, wherein the accident hotspot list is generated by a plurality of driving behavior events corresponding to each of the two-wheeled vehicles; and
  generating a warning message to remind a first driver of a first two-wheeled vehicle corresponding to the at least one first driving trajectory when determining that the at least one first driving trajectory matches the accident hotspot location,
wherein the server further performs following operations:
  calculating a driving evaluation score corresponding to each of the two-wheeled vehicles based on the driving behavior events;
  determining whether the driving evaluation score of a second two-wheeled vehicle is lower than a threshold; and
  generating a second warning message to remind a second driver of the second two-wheeled vehicle when determining that the driving evaluation score of the second two-wheeled vehicle is lower than the threshold.

2. The warning system of claim 1, wherein the server further performs following operations:
obtaining at least one candidate route corresponding to each of the two-wheeled vehicles based on a map data; and
selecting a shortest route from the at least one candidate route to correct the driving trajectory of each of the two-wheeled vehicles based on the driving trajectory and a corresponding forward direction of each of the two-wheeled vehicles.

3. The warning system of claim 1, wherein the server further performs following operations:
receiving a driving data of each of the two-wheeled vehicles from the sensing apparatuses; and
analyzing the driving data to generate the driving behavior events corresponding to each of the two-wheeled vehicles.

4. The warning system of claim 3, wherein the driving data include a speed value and a direction change amount corresponding to each of the two-wheeled vehicles during a running time.

5. The warning system of claim 1, wherein the server further performs following operations:
calculating at least one outlier among the driving behavior events to generate a plurality of dangerous driving behavior events corresponding to the two-wheeled vehicles;
performing a clustering algorithm on a piece of location information corresponding to each of the dangerous driving behavior events to generate a plurality of dangerous driving behavior event clusters; and
generating the accident hotspot list based on an amount of events and a central location of each cluster corresponding to each of the dangerous driving behavior event clusters.

6. The warning system of claim 1, wherein the server is configured to send the warning message to a helmet worn by the first driver, and the helmet is configured to emit a warning sound to remind the first driver.

7. The warning system of claim 1, wherein the server is configured to send the warning message to a mobile apparatus of the first driver, and the mobile apparatus further transmits the warning message to a helmet worn by the first driver, and the helmet is configured to emit a warning sound to remind the first driver.

8. The warning system of claim 1, wherein the server is configured to send the warning message to a mobile apparatus of the first driver, the mobile apparatus further transmits the warning message to a dashboard of the first two-wheeled vehicle, and the dashboard generates a warning sound or a flashing light to remind the first driver.

9. A warning method, being adapted for use in a warning system, the warning system comprising a plurality of sensing apparatuses and a server, the sensing apparatuses being configured to sense a driving trajectory of each of a plurality of two-wheeled vehicles, the warning method being performed by the server and comprising following steps:
receiving the driving trajectories from the sensing apparatuses;
comparing the driving trajectories with a plurality of driving behavior events to determine whether at least one first driving trajectory matches an accident hotspot location; and
generating a warning message to remind a first driver of a first two-wheeled vehicle corresponding to the at least one first driving trajectory when determining that the at least one first driving trajectory matches the accident hotspot location,
wherein the warning method further comprises following steps:
  calculating a driving evaluation score corresponding to each of the two-wheeled vehicles based on the driving behavior events;
  determining whether the driving evaluation score of a second two-wheeled vehicle is lower than a threshold; and
  generating a second warning message to remind a second driver of the second two-wheeled vehicle when determining that the driving evaluation score of the second two-wheeled vehicle is lower than the threshold.

10. The warning method of claim 9, wherein the warning method further comprises following steps:
obtaining at least one candidate route corresponding to each of the two-wheeled vehicles based on a map data; and
selecting a shortest route from the at least one candidate route to correct the driving trajectory of each of the two-wheeled vehicles based on the driving trajectory and a corresponding forward direction of each of the two-wheeled vehicles.

11. The warning method of claim 9, wherein the warning method further comprises following steps:
receiving a driving data of each of the two-wheeled vehicles from the sensing apparatuses; and
analyzing the driving data to generate the driving behavior events corresponding to each of the two-wheeled vehicles.

12. The warning method of claim 11, wherein the driving data includes a speed value and a direction change amount corresponding to each of the two-wheeled vehicles during a running time.

13. The warning method of claim 9, wherein the warning method further comprises following steps:
calculating at least one outlier among the driving behavior events to generate a plurality of dangerous driving behavior events corresponding to the two-wheeled vehicles;
performing a clustering algorithm on a piece of location information corresponding to each of the dangerous driving behavior events to generate a plurality of dangerous driving behavior event clusters;
generating an accident hotspot list based on an amount of events and a central location of each cluster corresponding to each of the dangerous driving behavior event clusters; and
comparing the driving trajectories with the accident hotspot list to determine whether the at least one first driving trajectory matches the accident hotspot location.

14. The warning method of claim 9, wherein the server is configured to send the warning message to a helmet worn by the first driver, and the helmet is configured to emit a warning sound to remind the first driver.

15. The warning method of claim 9, wherein the warning message is received by a mobile apparatus of the first driver, and the mobile apparatus further transmits the warning message to a helmet worn by the first driver, and the helmet is configured to emit a warning sound to remind the first driver.

16. The warning method of claim 9, wherein the warning message is received by a mobile apparatus of the first driver, the mobile apparatus further transmits the warning message to a dashboard of the first two-wheeled vehicle, and the dashboard generates a warning sound or a flashing light to remind the first driver.

* * * * *